Figure 1:
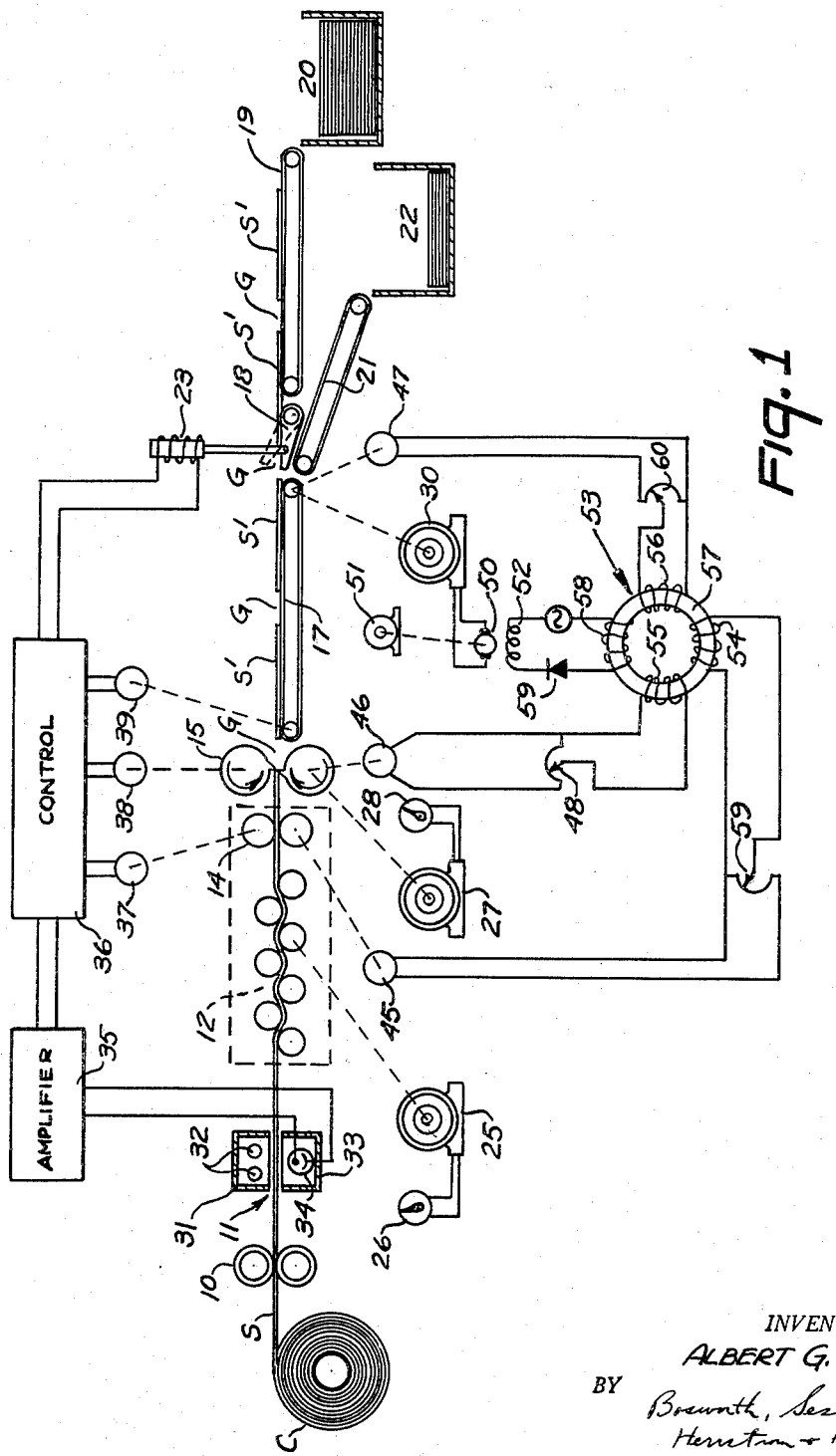

Feb. 14, 1961  A. G. OWEN  2,971,414
CONSTANT GAP CONTROL FOR SHEET SHEARING LINES
Filed Nov. 4, 1959  2 Sheets-Sheet 2

INVENTOR.
ALBERT G. OWEN
BY
ATTORNEYS

United States Patent Office 2,971,414
Patented Feb. 14, 1961

2,971,414

CONSTANT GAP CONTROL FOR SHEET SHEARING LINES

Albert G. Owen, Rockville, Md., assignor to Blaw-Knox Company, Pittsburgh, Pa., a corporation of Delaware Filed Nov. 4, 1959, Ser. No. 850,917

10 Claims. (Cl. 83—75)

This invention relates to apparatus for shearing rapidly moving strip material such as steel, tin plate, aluminum and the like into sheets by means of a flying shear and handling the sheets after the shearing has taken place. The invention is described herein in conjunction with apparatus for classifying tin plate and the like, but it is to be understood that the invention may be adapted to other uses and purposes.

In classifiers, as well as in other apparatus wherein strip material is rapidly sheared into sheets by means of a flying shear, it is customary to discharge the sheets from the shear onto a conveyor that is moving at a speed greater than the speed of the strip in order to create gaps between successive sheets. The gaps are necessary in classifiers, for example, to enable diverters to operate to divert sheets to separate pilers in accordance with the characteristics of the sheets. In other shearing lines gaps between sheets may be necessary in order to eliminate interference between sheets following the shearing operation to permit the sheets to be shingled and to enable pilers to operate correctly.

In operations of these types, if the gaps between the sheets are too small there may be interference between successive sheets as they travel through the apparatus and the deflecting mechanisms and pilers may not be able to operate correctly. If the gaps are too large it means that the sheets have been speeded up to an extent greater than necessary and any additional speed increases the difficulty in handling and piling the sheets. In classifiers, in which the material is gauged for thickness or inspected for pinholes or both while it is in strip form and then sheared and classified, the problem of deflecting a rapidly moving sheet having a pinhole, for example, at precisely the instant that it reaches a deflector that may be many feet "downstream" from a pinhole detector is a difficult one and variations in the gaps between sheets can result in improper operation of the classifier.

For these and other reasons it is desirable to maintain the length of the gaps between sheets in a sheet shearing line substantially constant at a value which may be varied by the operator to suit different operating conditions.

Accordingly, a general object of the present invention is the provision of an apparatus for automatically controlling the speed of the conveyor that receives sheets from a flying shear in a shearing line at such a value as to maintain the gaps between the sheets on the conveyor substantially constant. Other objects include the provision of such an apparatus that can be conveniently adjusted to set or vary the gap between the sheets; the provision of such an apparatus that will maintain the gap between the sheets at the preselected value even though the speed of the strip entering the shear, the lengths of the sheets cut by the shear or both be varied; the provision of such an apparatus that will be reliable and accurate in service, and the provision of such an apparatus that can be manufactured at reasonable cost of well-known and reliable components.

Figure 2:
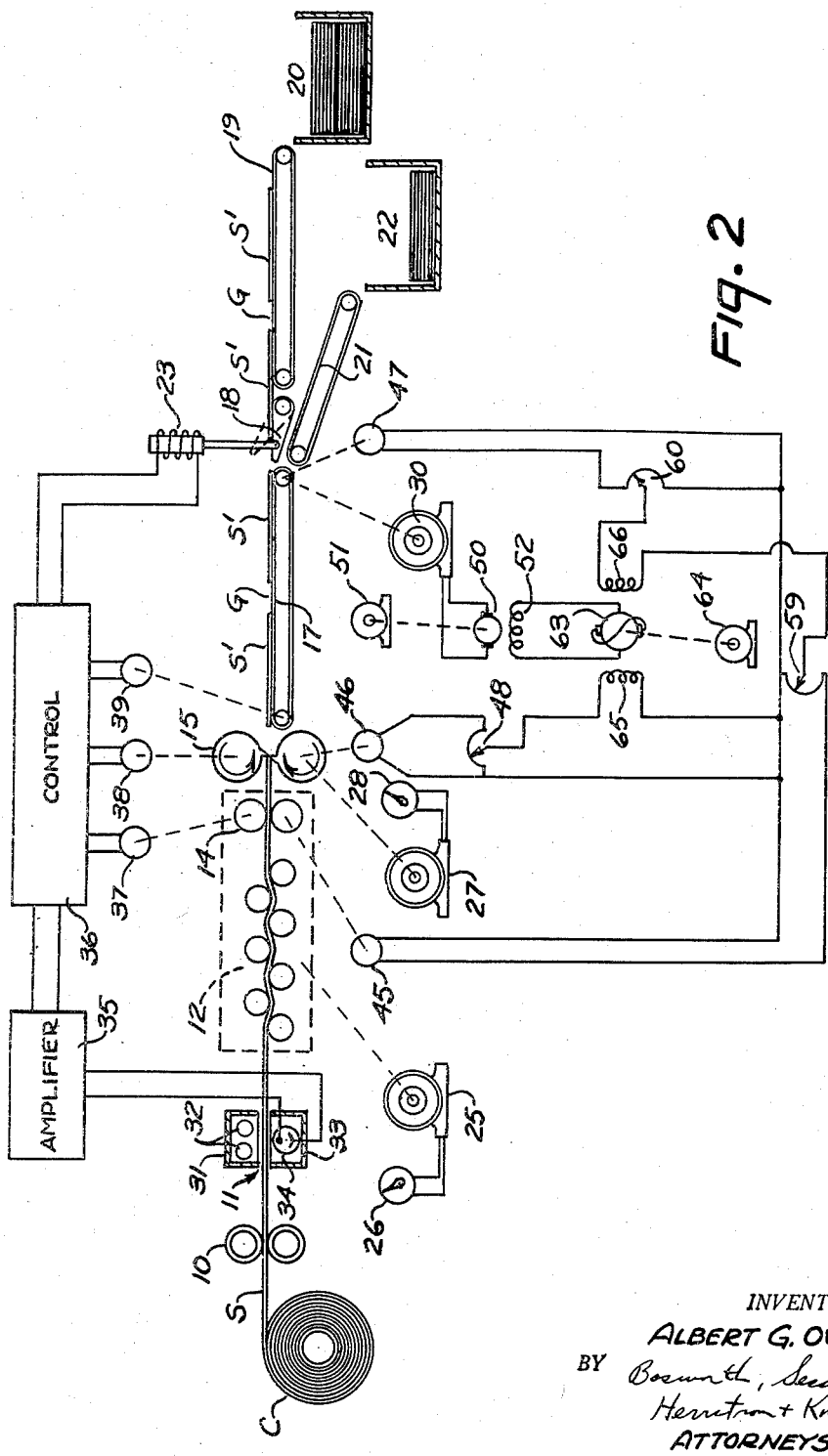

Further objects and advantages of the invention will become apparent from the following description of preferred forms thereof, reference being made to the accompanying drawings, in which:

Figure 1 is a diagrammatic illustration of an apparatus embodying preferred form of my invention; and, Figure 2 is a similar diagram showing a modified form of control apparatus.

Referring to Figure 1, which diagrammatically illustrates a classifying apparatus embodying a preferred form of my invention, a coil of strip material such as tin plate in strip form is indicated at C. The material is uncoiled by any conventional means into the form of a strip S which passes between pinch rolls 10 and then through a pinhole detector indicated in general at 11. From the pinhole detector the strip passes through a roller leveler 12 which delivers the strip through timing rolls 14 directly to a flying shear 15. The shear severs the strip into sheets S' which are deposited upon a receiving conveyor 17. The conveyor 17 operates at a speed slightly greater than the speed of the strip so that the sheets S' are spaced as they travel along the conveyor 17, the gaps between the sheets being indicated at G.

From the conveyor 17 the sheets pass to a deflector 18 which may be of any known construction, either mechanical as shown or magnetic if the apparatus is intended for use with ferrous sheets. The normal path of the sheets leads to a conveyor 19 and piler 20 for the prime sheets, while sheets that contain a pinhole are deflected by deflector 18 to a conveyor 21 and piler 22. The deflector 18 may be actuated by a solenoid 23 or in any other convenient manner in response to signals initiated by the pin hole detector 11.

In order to provide flexibility of operation and to enable the apparatus to operate throughout a wide speed range and to cut and pile sheets of a considerable range of length, the roller leveler 12 which withdraws the strip S from the coil C and delivers it to the shear 15 is driven by an adjustable speed motor 25 which is controlled by a speed control 26, and the shear 15 is driven by an adjustable speed motor 27 which is controlled by a speed control 28. Variable voltage generators with manual control of the field excitation of the generators are frequently used for these services but any suitable known or conventional speed control system can be utilized. The receiving conveyor 17 is also driven by an adjustable speed motor 30.

The pinhole detector 11 may be of generally conventional construction, comprising an upper element 31 containing fluorescent lamps or other suitable light sources 32 and a lower element 33 containing photoelectric cells or other suitable photosensitive elements 34. Light passing through a pinhole in the strip causes one or more of the photocells to produce an output pulse that is amplified by an amplifier 35. The pulse from the amplifier is fed to a control 36 which includes a memory device or the like such that the pulse will energize the solenoid 23 and move deflector 18 to the broken line position just as the sheet that contains the pinhole approaches the deflector. The deflector is returned to normal position as soon as the defective sheet has passed.

The control 36 receives signals from a tachometer generator 37 driven in timed relationship with the strip by the timer rolls 14, a tachometer generator 38 driven in timed relationship with the shear 15 and a tachometer generator 39 that is driven in timed relationship with the receiving conveyor 17.

Various types of devices for controlling the operation of a deflector in response to a signal from a pinhole detector, gauge or the like are known and form no part of the present invention. However, it is to be noted that it is important for proper operation of some types of devices that the gaps G between the sheets S' as they travel from the shear 15 to the deflector 18 be maintained at a substantially constant value; otherwise the signal from the timer to the deflector 18 may be given at the wrong time. Moreover, in all installations, the gaps between sheets must be large enough to permit the deflector to operate, to prevent successive sheets from interfering with each other and to permit the sheets to be shingled, but should not be larger than necessary. It is for these reasons that it is very desirable to maintain the length of the gaps between sheets at a constant value in classifiers as well as in other types of strip shearing lines and the present invention is directed to a solution of this problem.

It will be evident that the speed of the receiving conveyor 17, which is driven by the variable speed motor 30 must be controlled in accordance with the speed of the advancing strip and the number of cuts made by the shear if the gap between sheets is to be maintained at a desired value. If the velocity ($V_1$) of the strip as it is fed to the shear is divided by the number of cuts (N) per minute made by the shear the result will be the length (L) of the sheets S' that are cut by the shear. Since the receiving conveyor 17 carries sheets separated by gaps, the receiving conveyor speed $V_2$ in feet per minute must equal the strip speed $V_1$ plus the product of the desired length of gap G in feet times the number of cuts per minute N in order to produce gaps of the desired length. This may be expressed as follows:

$$V_2 = V_1 + GN$$

For example, if the velocity of the strip is 500 feet per minute and the shear is making 100 cuts per minute and it is desired to maintain a gap of 6 inches (0.5 feet) between sheets, then the entry conveyor should be operated at a speed of 550 feet per minute. If the strip speed is increased to 600 feet per minute and the number of cuts per minute of the shear is correspondingly increased to 120 so that the sheets remain of the same length, then the speed of the conveyor 17 should be increased to 660 feet per minute in order to maintain the gap at 0.5 feet the strip. If the strip speed is held constant at 500 feet per minute but the number of cuts per minute is increased to 200, thereby cutting sheets 2½ feet long, then in order to maintain the gap at 0.5 feet the speed of the conveyor 17 must be increased to 600 feet per minute. If the speed of the entering strip is reduced to 400 feet per minute while the shear continues to make 100 cuts per minute thus producing sheets 4 feet long, then the conveyor 17 should be operated at a speed of 450 feet per minute in order to maintain the gap length constant at 0.5 feet.

The present invention provides means for maintaining the gaps between successive sheets substantially constant at any value that may be selected within the range of the apparatus and for all speeds of the entering strip and numbers of cuts per minute within the range of operation of the machine.

According to the present invention the desired length of gap is automatically maintained by controlling the speed of the receiving conveyor 17 in accordance with a signal derived from the speed of the entering strip and a signal that is a function of the number of cuts per minute made by the flying shear. In practice, according to the preferred form of the invention specifically disclosed herein, the speed of the motor 30 which drives the receiving conveyor 17 is controlled in accordance with the algebraic sum of signals derived from a D.C. tachometer generator 45 driven by the rolls 14 at a speed proportional to the speed of the entering strip, a D.C. tachometer generator 46 driven by the shear 15 so that the output of the tachometer generator 46 is a function of the number of cuts per minute made by the shear, and a D.C. tachometer generator 47 driven at a speed proportional to the speed of the receiving conveyor, which furnishes a feedback signal that is opposed to the signal derived from tachometer 45. This may be expressed as follows:

$$S_c = (T_1 - T_3) + KT_2$$

In the above equation $S_c$ is the control signal used to control the motor 30; $T_1$, $T_2$ and $T_3$ are respectively, the output signals of the tachometer generators 45, 46, and 47; and K is the gap control factor which is introduced instrumentally by, for example, a variable resistor or potentiometer 48 in the shear tachometer circuit. The output signals of the tachometer generators are D.C. voltages that vary directly with the speeds at which the respective tachometer generators are driven.

It will be evident that if the potentiometer 48 is adjusted so that no signal is delivered by tachometer generator 46 thus making the gap control factor zero, the control signal will be determined entirely by $T_1$ and the feedback signal $T_3$ which brings the system into equilibrium when the motor 30 reaches the proper speed. In practice these opposing signals are adjusted so that in the absence of a gap signal from the shear tachometer generator the receiving conveyor 17 is driven at the same speed as the entering strip; i.e., with the apparatus set for zero gap, the speed of motor 30 directly corresponds to the speed of motor 25 that drives the leveler 12, the speed of motor 25 being adjustable. In ordinary operation the apparatus is set for a desired length of gap by proper setting of the potentiometer 48, the gap control factor K takes an appropriate finite value and the tachometer generator 46 becomes effective, along with tachometer 45, in the control of the speed of the motor 30. The motor 30 is then driven at a speed sufficient to give the desired gap between the sheets S' on the conveyor 17. The gap introduced remains constant so long as the resistor 48 remains at the same setting, regardless of variations in speed of the entering strip or of the shear.

Figure 1 of the drawing shows a simple and effective apparatus for controlling the speed of the motor 30 in accordance with the signals derived from tachometer generators 45, 46 and 47. In this embodiment of the invention, motor 30 is energized by means of a variable voltage generator 50 driven, for example, by a constant speed motor 51. The field 52 of the generator is energized by means of a magnetic amplifier 53.

The outputs of the tachometer generators 45, 46 and 47 are fed to the input windings 54, 55 and 56 respectively of the magnetic amplifier which is shown as having a conventional toroidal core 57 and an output winding 58. The output winding is energized by an appropriate A.C. source as shown. The output circuit contains a rectifier 59 and the rectified output is supplied to the field 52 of the variable voltage generator 50. The connections to tachometer generators 45, 46 and 47 are such that the signals $T_1$ and $T_2$ derived from tachometer generators 45 and 46 are additive while the feedback signal $T_3$ derived from tachometer generator 47 is opposed to these signals. With this type of device an increase in signals $T_1$ and $T_2$ increases the saturation of the core 57 and increases the output of the output winding 58 and hence the output of the generator 50 and the speed of motor 30. The feedback signal $T_3$ opposes the signals $T_1$ and $T_2$ and brings the system to equilibrium when motor 30 has reached the desired speed.

Appropriate calibrating resistors or potentiometers 59 and 60 are included in the circuits to tachometer generators 45 and 47. These potentiometers make it possible to adjust the outputs of tachometer generators 45 and 47 to insure that the speed of the receiving conveyor will substantially equal the speed of the strip S in the absence of a gap signal from tachometer generator 46.

Once the circuit has been properly calibrated the desired gap between sheets can be set by means of potentiometer 48, which introduces the factor K into the system by varying the effective output of tachometer generator 46. The selected gap will be maintained regardless of variations in speed of the entering strip brought about by adjustment of the speed of motor 25 through control 26 or in the number of cuts per minute of the shear brought about by adjustment of the motor 27 by means of the control 28. In a classifier such as shown, this makes possible the more accurate operation of the deflector 18 and reduces the likelihood of jamming of the sheets in their passage through the apparatus or of incorrect piling or diversion of the sheets. The control is useful in other strip shearing lines as well, particularly in high speed lines where the sheets are delivered to pilers.

Figure 2 of the drawings is a diagram showing a modified form of control for the motor 30. Except for the different control, the showing is identical with Figure 1, and the same reference characters have been applied to corresponding parts. As before the motor 30 is energized by a variable voltage generator 50 having a field 52. In this form of the invention, however, the field 52 of generator 50 is energized by means of an "amplidyne" or similar device 63 which is driven by a constant speed motor 64. The amplidyne is of conventional and known construction and includes control fields 65 and 66 in addition to a self excited field (not shown). Control field 65 is energized from the output of tachometer generator 46, the circuit including potentiometer 48 as before. The energization of field 65 thus corresponds to $KT_2$. Control field 66 is connected to tachometer generators 45 and 47 with the outputs of the tachometer generators opposing; hence the energization of field 66 corresponds to the factor $(T_1-T_3)$ in the equation given above. As before, calibrating resistors 59 and 60 are included in the circuits leading to tachometer generators 45 and 47. The output of the amplidyne is controlled by the energization of the fields 65 and 66 and thus corresponds to $(T_1-T_3)+KT_2$. Since the amplidyne furnishes the field excitation for the variable voltage generator 50, the speed of motor 30 is controlled by the amplidyne.

The operation of the system with this control is the same as that described before, the gap being determined by the setting of the resistor 48 and maintained constant throughout varying speed ranges and numbers of cuts so long as the resistor 48 remains in a given position of adjustment.

Various changes and modifications can be made in the preferred forms of the invention disclosed herein without departing from the spirit and the scope of the invention. For example, the invention may be adapted to classifiers of different types and to various other types of shear lines. Different motor speed control systems can be employed. Other changes and modifications may occur to those skilled in the art. The essential characteristics of the invention are defined in the appended claims.

I claim:

1. In a strip shearing line having a shear, means for delivering strip to the shear, means for driving said delivering means at varying rates of speed, means for operating said shear at varying numbers of cuts per minute, a conveyor for receiving sheets cut by said shear, means for driving said receiving conveyor at varying rates of speed in excess of the speed of said delivering means to provide gaps between successive sheets on receiving conveyor, and means for controlling the speed of said receiving conveyor in response to the speed of said delivering means and the number of cuts per minute made by said shear to maintain the gap between the sheets on said conveyor substantially equal to a predetermined value regardless of changes in the speed of said delivering means and changes in the number of cuts per minute made by said shear.

2. In a strip shearing line having a shear, means for delivering strip to the shear, means for driving said delivering means at varying rates of speed, means for operating said shear at varying numbers of cuts per minute, a conveyor for receiving sheets cut by said shear, means for driving said receiving conveyor at varying rates of speed in excess of the speed of said delivering means to provide gaps between successive sheets on said receiving conveyor, and means for controlling the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a tachometer generator driven by said delivering means, a tachometer generator driven by said shear, and means responsive to the combined outputs of said tachometers for controlling the speed of said driving means.

3. Apparatus according to claim 2 having a tachometer generator driven by said receiving conveyor for providing a feed-back signal to said control means.

4. Apparatus according to claim 2 having a variable resistance in the circuit of tachometer generator driven by said shear for adjusting said gap.

5. In a strip shearing line having a shear, means for delivering strip to the shear, means for driving said delivering means at varying rates of speed, means for operating said shear at varying numbers of cuts per minute, a conveyor for receiving sheets cut by said shear, an electric motor for driving said receiving conveyor at varying rates of speed in excess of the speed of said delivering means, and means for controlling the speed of said motor and said receiving conveyor in response to the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a variable voltage generator for supplying electrical energy to said motor, and means responsive to the speed of said delivering means and the number of cuts per minute made by said shear for supplying excitation to the field of said variable voltage generator.

6. In a strip shearing line having a shear, means for delivering strip to the shear, means for driving said delivering means at varying rates of speed, means for operating said shear at varying numbers of cuts per minute, a conveyor for receiving sheets cut by said shear, an electric motor for driving said receiving conveyor at varying rates of speed in excess of the speed of said delivering means, and means for controlling the speed of said motor and said receiving conveyor in response to the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a variable voltage generator for supplying electrical energy to said motor, and means responsive to the speed of said delivering means, the number of cuts per minute made by said shear and the speed of said receiving conveyor for supplying excitation to the field of said variable voltage generator.

7. In a strip shearing line having a shear, means for delivering strip to the shear, means for driving said delivering means at varying rates of speed, means for operating said shear at varying numbers of cuts per minute, a conveyor for receiving sheets cut by said shear, an electric motor for driving said receiving conveyor at varying rates of speed in excess of the speed of said delivering means, and means for controlling the speed of said motor and said receiving conveyor in response to the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a variable voltage generator for supplying electrical energy to said motor, and circuit means including a magnetic amplifier responsive to the speed of said delivering means, the number of cuts per minute made by said shear and the speed of said receiving conveyor for supplying excitation to the field of said variable voltage generator.

8. In a strip shearing line having a shear, means for delivering strip to the shear, means for driving said delivering means at varying rates of speed, means for operating said shear at varying numbers of cuts per minute, a conveyor for receiving sheets cut by said shear, an electric motor for driving said receiving conveyor at varying rates of speed in excess of the speed of said delivering means, and means for controlling the speed of said motor and said receiving conveyor in response to the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a variable voltage generator for supplying electrical energy to said motor, a tachometer generator driven by said delivering means, a tachometer generator driven by said shear and a tachometer generator driven by said receiving conveyor, and means responsive to the outputs of said tachometer generators for supplying excitation to the field of said variable voltage generator.

9. In a strip shearing line having a shear, means for delivering strip to the shear, mean for driving said delivering means at varying rates of speed, means for operating said shear at varying numbers of cuts per minute, a conveyor for receiving sheets cut by said shear, an electric motor for driving said receiving conveyor at varying rates of speed in excess of the speed of said delivering means, and means for controlling the speed of said motor and said receiving conveyor in response to the speed of said delivering means and the speed of said shear to maintain the gap between the sheets on said conveyor substantially equal to a predetermined value regardless of changes in the speed of said delivering means and changes in the number of cuts per minute made by said shear, said controlling means comprising a variable voltage generator for supplying electrical energy to said motor, a tachometer generator driven by said delivering means, a tachometer generator driven by said shear, and a magnetic amplifier having input windings energized by said tachometer generators and an output winding.

10. In a classifier having a means for inspecting strip, a flying shear for shearing the previously inspected strip into sheets, means for delivering the strip to the shear, means for driving said delivering means at varying rates of speed, means for operating said shear at varying numbers of cuts per minute, a deflector for deflecting sheets cut by said shear into separate paths in accordance with a characteristic of said sheets determined by said inspecting means, a conveyor for receiving sheets cut by said shear and conveying them to said deflector, means for driving said receiving conveyor at varying rates of speed in excess of the speed of said delivering means, and means for controlling the speed of said receiving conveyor in response to the speed of said delivering means and the number of cuts per minute made by said shear to maintain the gap between the sheets on said conveyor substantially equal to a predetermined value regardless of changes in the speed of said delivering means and changes in the number of cuts per minute made by said shear.

References Cited in the file of this patent

UNITED STATES PATENTS

| | | |
|---|---|---|
| 1,913,153 | De Salardi | June 6, 1933 |
| 2,229,638 | Chamberlin | Jan. 28, 1941 |

FOREIGN PATENTS

| | | |
|---|---|---|
| 1,112,167 | France | Nov. 9, 1955 |
| 801,251 | Great Britain | Sept. 10, 1958 |